United States Patent [19]

Mizuta et al.

[11] Patent Number: 4,727,302
[45] Date of Patent: Feb. 23, 1988

[54] REAR VIEW MIRROR POSITION CONTROL DEVICE OF AUTOMOBILE

[75] Inventors: Ken Mizuta, Miyagi; Shiro Kondo, Furukawa, both of Japan

[73] Assignee: Alps Electric Co., Ltd., Japan

[21] Appl. No.: 843,066

[22] Filed: Mar. 24, 1986

[30] Foreign Application Priority Data

Mar. 23, 1985 [JP] Japan .............................. 60-41023[U]

[51] Int. Cl.$^4$ ............................................. G05B 19/10
[52] U.S. Cl. .................................... 318/567; 318/466; 350/637
[58] Field of Search ................ 318/568, 567, 466–468; 350/637, 632, 633, 634

[56] References Cited

U.S. PATENT DOCUMENTS

| | | | |
|---|---|---|---|
| 4,264,849 | 4/1981 | Fleischer | 318/568 |
| 4,451,887 | 5/1984 | Harada | 364/424 |
| 4,454,390 | 6/1984 | Gmeiner et al. | 200/6 A |
| 4,477,874 | 10/1984 | Ikuta | 364/424 |
| 4,544,871 | 10/1985 | Suzuki | 318/568 |

FOREIGN PATENT DOCUMENTS 57-60943 4/1982 Japan .

Primary Examiner—William M. Shoop, Jr.
Assistant Examiner—Patrick C. Keane
Attorney, Agent, or Firm—Guy W. Shoup

[57] ABSTRACT

A mirror position control device for use in an automobile has mirror angle adjusting motors for adjusting the angle of the mirror to a position previously determined by an individual driver, a memory unit for storing the angles of the mirror desired by each of a plurality of drivers, an angle detector for detecting the actual angle of the mirror, and a control unit for comparing the actual angle as detected by the angle detector with the predetermined angle of an individual driver stored in the memory unit and for applying a control signal to the mirror angle adjusting motors to adjust the angle of the mirror to the optimum angle suited for the individual driver.

7 Claims, 8 Drawing Figures

REAR VIEW MIRROR POSITION CONTROL DEVICE OF AUTOMOBILE

BACKGROUND OF THE INVENTION

1. Field of the Invention

This invention relates to a mirror position control device for automobiles that adjusts the viewing angle of a mirror automatically to accomodate a driver's individual preferences.

2. Description of the Prior Art

The optimum angle of a rear view mirror of an automobile varies depending upon the driver's individual characteristics, such as size, posture, driving habits, etc. The automobile is sometimes shared by members of a family, office, etc. and the optimum position and/or angle of the rear view mirror differs from driver to driver; thus, the angle of the rear view mirror must be adjusted each time a different driver enters the automobile. This adjustment is troublesome, and if a new person drives the automobile without adjusting the angle of the mirror, either because they forget or they do not want to go through the bother of adjusting the mirrors in the vehicle, then the danger of an accident being caused due to improper mirror positioning increases.

SUMMARY OF THE INVENTION

The present invention has been devised in view of the foregoing circumstances, and its general object is to provide a mirror position control device in an automobile which automatically adjusts the angle of a rear view mirror to the optimum setting suited to the individuality of respective drivers through a very simple operation.

To achieve the foregoing object, the present invention provides a mirror position control device for an automobile which comprises a mirror angle adjusting means responsive to a control signal from a control unit for inclining an angle-adjustable mirror of the automobile in any desired direction depending upon the driver's individuality, a detecting means for detecting the angle/position of the rear view mirror and supplying this position data to the control unit, a memory unit for storing optimum mirror positions for each driver and supplying these optimum positions to the control unit, and an activation switch which activates the control unit to compare the actual mirror position based on data supplied by the detecting means with the optimum mirror position previously stored by an individual driver in the memory unit and to apply a control signal to the mirror angle adjusting means so as to adjust the position of the mirror to the optimum position preferred by each individual driver.

The optimum angle of the rear view mirror generally differs when driving in reverse gear, as opposed to normal forward driving, for example, when parking the car into a garage. Therefore, provisions are made for storing data of both the normal forward gear and also the reverse gear in the memory unit, and the position of the rear view mirror may be adjusted by means of the control unit on the basis of whether the vehicle is being driven in forward or reverse gear.

DESCRIPTION OF THE PREFERRED EMBODIMENT

An embodiment of the present invention will now be described with reference to the drawings.

Figure 1:
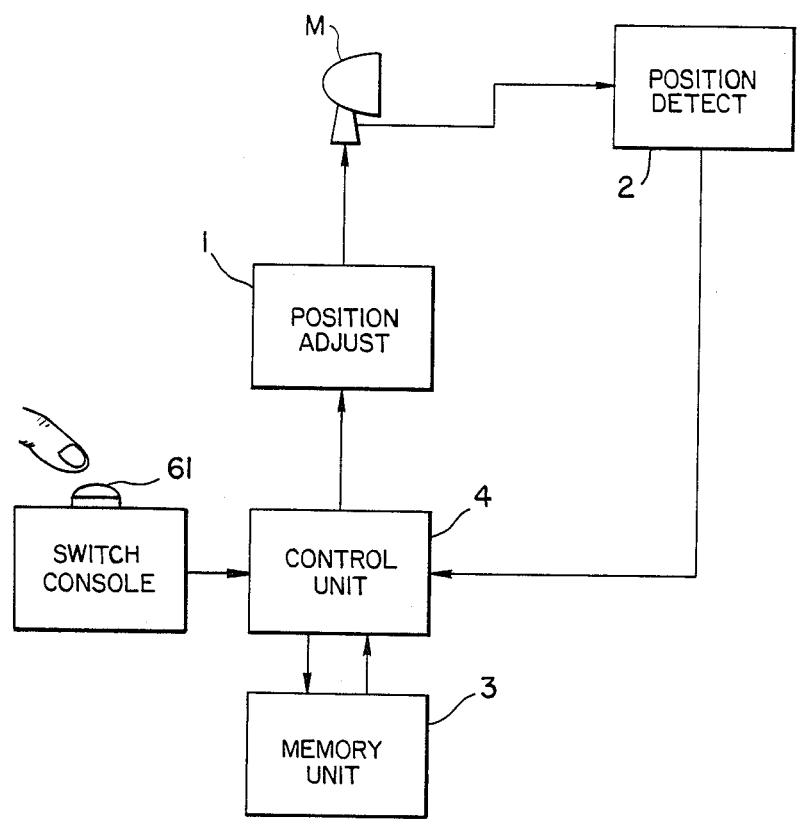
FIG. 1 is a block diagram showing one basic configuration of the present invention.

FIG. 1 illustrates a basic structure for realizing the present invention. A mirror M is provided with position adjusting means 1 for adjusting the viewing position of the mirror and position detecting means 2 for determining the position of the mirror. A predetermined optimum-position (OPT) is stored in a memory unit 3 which supplies the optimum position to a control unit 4 and the control unit 4 generates a control signal to the adjusting means causing the mirror to move from its detected position to the optimum position.

Figure 2:
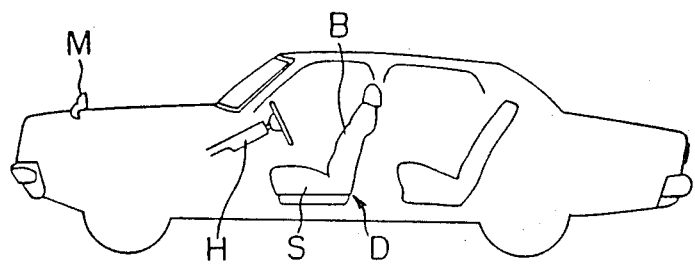
FIG. 2 is a general structural diagram of an automobile.

Referring to FIG. 2, the embodiment described below is integrated into a larger autombile control system which can adjust the position of a driver's seat D, in addition to the angle of a rear view mirror M. Regarding the positional adjustment of the driver's seat D, the inclination angle of a seat back portion B relative to a seat portion S, (its reclining angle) can be adjusted in addition to positional adjustment of the driver's seat D in the longitudinal direction forward and away from a steering wheel H.

Figure 3:
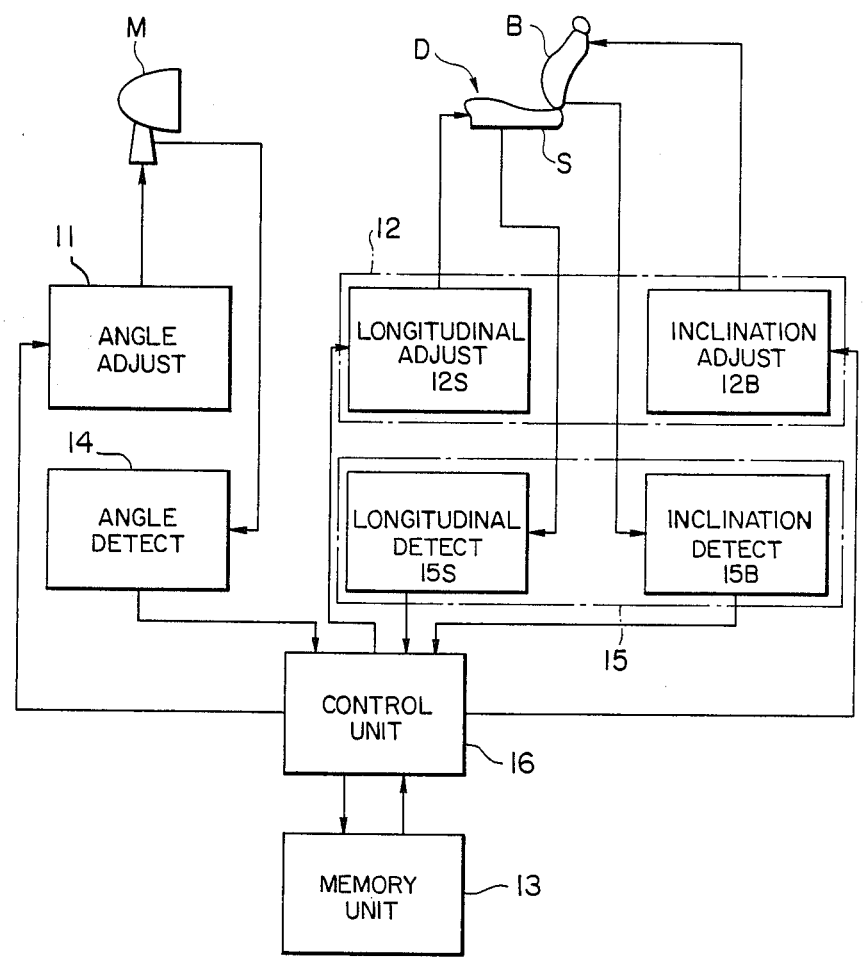
FIG. 3 is a general block diagram of a driving position control device including the configuration of FIG. 1.

To provide integrated adjustment of the driver's seating environment, the embodiment is configured as shown in FIG. 3.

As shown in FIG. 3, the automobile is equipped with a mirror angle adjusting means 11 for adjusting the angle of the angle-adjustable mirror M and a driver's seat position adjusting means 12 for adjusting the position of the driver's seat D. This driver's seat position adjusting means 12 is composed of a longitudinal position adjusting means $12_S$ for adjusting the seat position in the longitudinal direction an an inclination adjusting means $12_B$ for adjusting the inclination angle of the seat back portion B. Regarding the angle of the rear view mirror M and the position of the driver's seat D, the optimum values are set with respect to a preferred arrangement for each driver and these values are stored in a memory unit 13 as a data group which is assigned a unique identifying code. The data concerning the driving position includes the optimum setting for driving in reverse gear, as well as that for forward gear. The actual angle/position of the rear view mirror M and the position of the driver's seat D, are measured with detecting means 14 and 15. The detecting means 15 is composed of a longitudinal position detecting means $15_S$ for detecting the position in the longitudinal direction of the driver's seat D attained by the seat position adjusting means $12_S$, and an inclination detecting means $15_B$ for detecting the inclination angle of the seat back portion B. Position signals are supplied to a control unit 16 from the respective detecting means 14, $15_S$ and $15_B$, these position angles are compared with the optimum positions desired by an individual driver which have previously been stored in the memory unit 13, and on the basis of the comparison, control signals are applied to the mirror angle adjusting means 11 and driver's seat position adjusting means 12, to move the rear view mirror M and driver's seat D to the predetermined optimum position desired by an individual driver.

Figure 4:
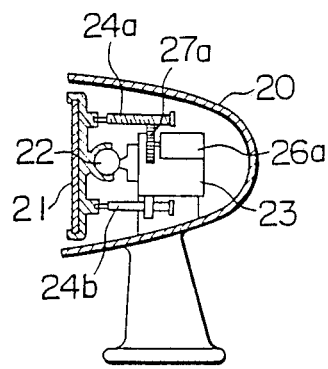
FIGS. 4 and 5 are respectively a vertical section view and a transverse section view showing the configuration of a mirror angle adjusting means.
Figure 5:
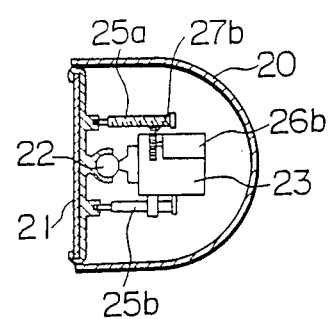

The mirror angle adjusting means 11 may have the configuration shown in FIGS. 4 and 5, for example. In these drawings, a mirror 21 is arranged at the open end of a mirror casing 20 and supported at the center of its back portion by a spherical joint 22 provided on a supporting member 23 mounted inside the mirror casing 20 so that the mirror 21 can be inclined in any desired direction. To the mirror 21 are coupled a pair of operation levers 24a and 24b arranged vertically on either side of the spherical joint 22 and another pair of operation levers 25a and 25b arranged horizontally on either side of the spherical joint, and these operation levers 24a, 24b, 25a and 25b are supported by the supporting member 23 such that they can slide in the axial direction. Among the vertically-arranged operation levers 24a and 24b and horizontally-arranged operation levers 25a and 25b, levers 24a and 25a are in the form of a screw lever having a thread groove formed on their peripheral surface, and these screw levers 24a and 25a are in mesh with gears 27a and 27b attached to electric motors 26a and 26b, respectively. Accordingly, by energizing the vertical-plane electric motor 26a selectively, the operation levers 24a and 24b are displaced forward and rearward and the mirror 21 inclines upward or downward, whereas energizing the horizontal-plane motor 26b causes the operation levers 25a and 25b to be displaced forward and rearward and the mirror 21 inclines rightward or leftward. Thus, by combining these operations it becomes possible to incline the mirror 21 in any desired direction about the spherical joint 22.

Figure 6:
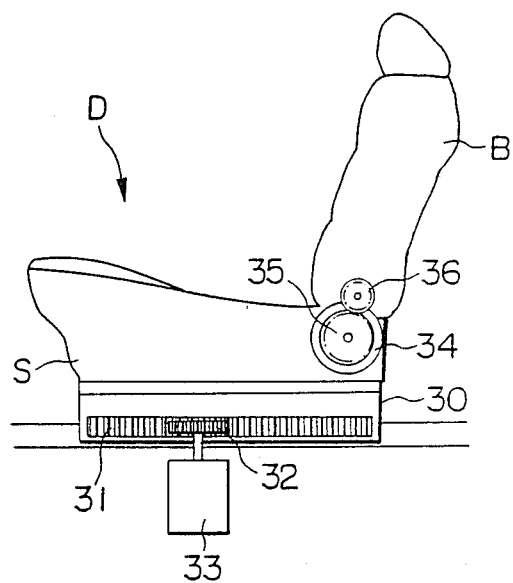
FIG. 6 is an explanation view showing the configuration of a driver's seat position adjusting means.

The driver's seat position adjusting means for adjusting the position of the driver's seat D may have the configuration shown in FIG. 6, for example.

In this drawing, the seat portion S of the driver's seat D is secured on a slide truck 30, to the slide truck 30 a rack 31 is attached, and a pinion 32 in gear with the rack 31 is attached to the output shaft of an electric motor 33. By energizing the electric motor 33, the seat portion S can move in the longitudinal direction, i.e. moving toward or away from the steering wheel H. These members make up the longitudinal position adjusting means $12_S$. The inclination adjusting means $12_B$ for adjusting the inclination angle of the seat back portion B, i.e. the reclining angle, is composed of an electric motor 34, a gear 35 attached to the output shaft of the electric motor 34, and a gear 36 in mesh with the gear 35, this gear 36 being attached to the seat back portion B.

Among the detecting means 14, $15_S$ and $15_B$ for detecting the respective conditions of the rear view mirror M, driver's seat D and seat back portion B which are displaced respectively by the mirror angle adjusting means 11, seat position adjusting means $12_S$ and seat back portion angle adjusting means $12_B$, the mirror detecting means 14 may be added to the mirror angle adjusting means 11 and may be made of rotary encoders for detecting the rotation of the gears 27a and 27b, or photo sensors etc. for detecting the respective slide positions of the operation levers 24a, 24b, 25a and 25b.

The detecting means $15_S$ added to the seat position adjusting means $12_S$ is preferably a photo sensor for detecting the amount of movement of the slide truck 30, and the detecting means $15_B$ relating to the seat back portion angle adjusting means $12_B$ is preferably a rotary encoder for detecting the rotation of the gear 35.

Figure 7:
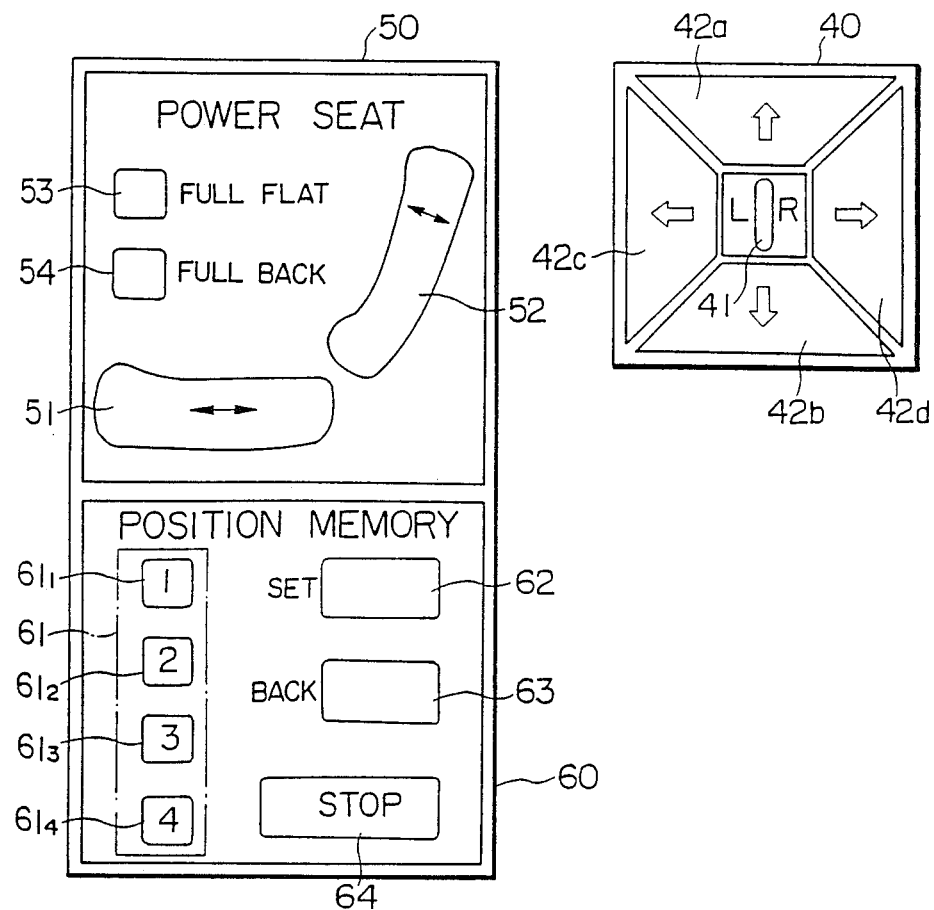
FIG. 7 is an arrangement diagram showing switch buttons etc. provided in console section of the control device.

As illustrated in FIG. 7, a console section 40 for operating the mirror angle adjusting means 11 and another console section 50 for operating the seat position adjusting means $12_S$ and seat back portion angle adjusting means $12_B$, together with a further console section 60 for inputting instruction control signals to the control unit 16, are located at positions close to the driver's seat D so as to be easy for the driver to operate.

The console section 40 has a knob 41 in its center. When the knob 41 is turned rightward or leftward, the corresponding right-hand or left-hand rear view mirror M is activated to be adjustable in angle. When the knob is at a neutral position or lock position, both the right-hand and left-hand rear view mirrors M become unadjustable and are fixed. Around the knob 41 are provided buttons 42a, 42b, 42c and 42d forming four momentary switches, and when an appropriate one of these buttons 42a, 42b, 42c and 42d is pushed, the mirror 21 inclines correspondingly upward, rightward or leftward.

The console section 50 includes an adjusting button 51 relating to the driver's seat D and a reclining button 52 for adjustment of the inclination angle of the seat back portion B, each being a momentary switch. As the adjusting button 51 is pushed the driver's seat D moves forward, for example and as the reclining button 52 is pushed the seat back portion B rises toward the upright position. The console section 50 includes further a full flat button 53 and full back button 54, made of tact switches. As the full flat button 53 is pushed the seat back portion B changes and assumes a substantially-horizontal full flat position, and as the full back button 54 is pushed the driver's seat moves rearward up to the rearmost position away from the steering wheel.

To permit entry of instruction/control signals into the control unit 16, the console section 60 is equipped with the following switch buttons; a switch button group 61 consisting of four button $61_1$–$61_4$, these buttons $61_1$–$61_4$ being assigned to identify one of four drivers designated to drive the subject automobile so that if the designated button of the swtich button group 61 is pushed the data concerning that individual driver is accessed; a set switch button 62 for writing data concerning the preferred mirror/seat position when driving in forward gear of the designated driver into the memory unit 13; a back switch button 63 for accessing the preferred data for a reverse gear situation (i.e. when the driver is putting the car into the garage) of the designated driver; and an emergency stop button 64 for halting the operation of several mechanisms in the course of alteration of the driver's settings.

Figure 8:
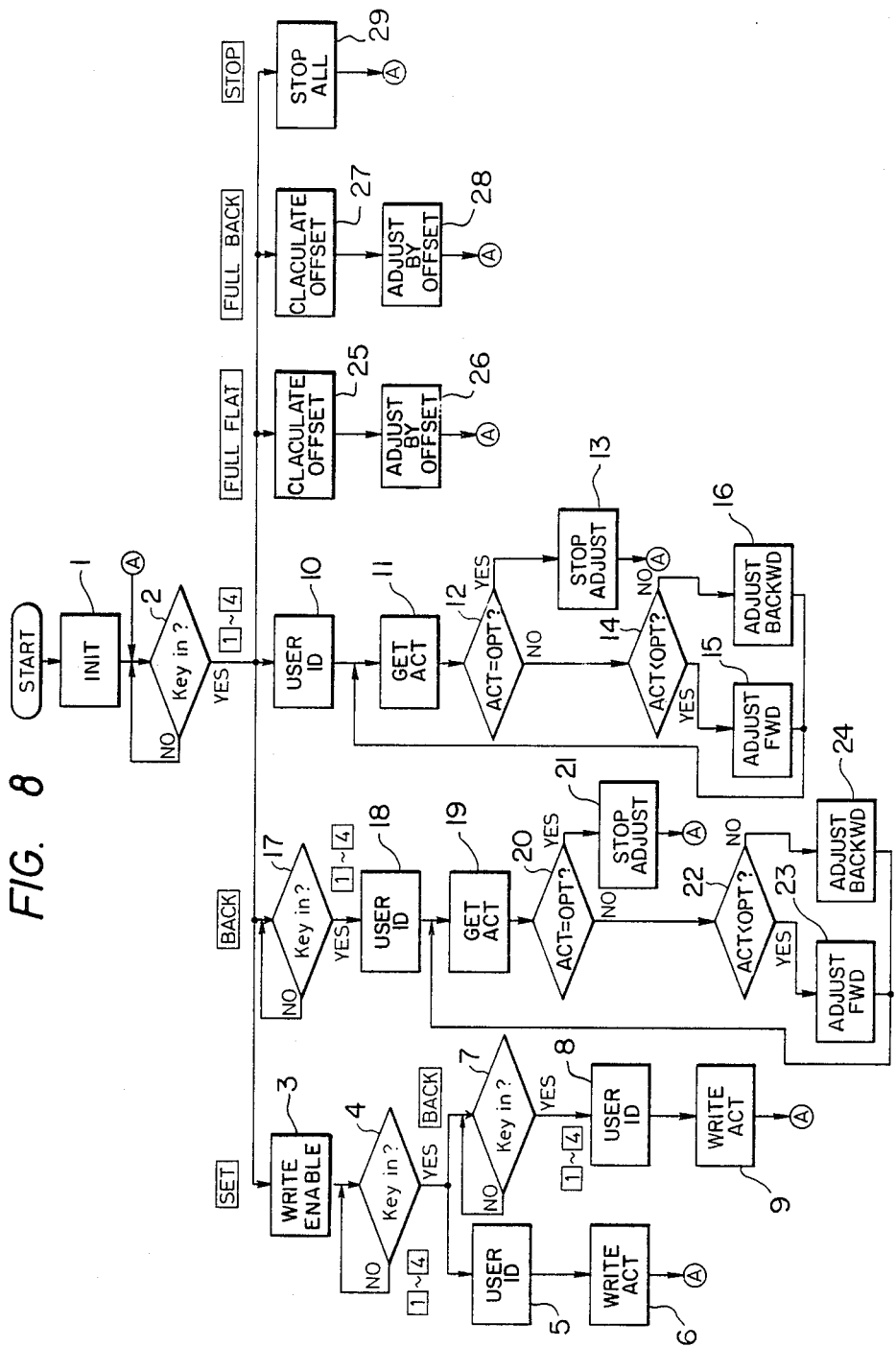
FIG. 8 is a flowchart showing the operations of a control unit.

The operation of the control unit will be described with reference to FIG. 8., when the starter of the automobile is powered up, initialization step 1 is performed to initialize the microcomputer (control unit), such as inhibiting interruption, setting of the full back positon and full flat position, and setting of a timer. Until a button on the console section 60 is pushed, the system stands in a standby or key-in state (step 2).

To enter the preferred (optimum) setting of the mirror/seat for any one driver, the set switch button 62 is pushed. As a result, the memory unit 13 is prepared for writing (step 3), and a key-in state is again entered at step 4. As any one button ($61_1$–$61_4$) of the switch button group 61 is pushed, the indentification address of the driver designated by that button pushed is set (step 5). Following the above, in step 6, the actual mirror/seat position (ACT) is detected by the detecting means and is written into memory as the optimum position desired by the user. That is, the data concerning the angle of the rear view mirror M, the position of the driver's seat D and the angle of the seat back portion B adjusted through control of the console sections 40 and 50 are detected by the detecting means 14, $15_S$ and $15_B$, the thus detected signals are input into the control unit 16 as representing the optimum driving position, and stored in the memory unit 13 at the address generated in step 5. In the above operation, if some other data has been previously written in the designated area of the memory unit 13, this old data is erased concurrently with the new-writing.

To store the optimum driving position for reverse gear driving such as when putting the car into a garage, the back switch button 53 is pushed in the key-in state of step 4. As a result, a key-in state is entered (step 7). Following the above, as one button ($61_1$–$61_4$) pertinent to the subject driver of the switch button group 61 is pushed, the identifying address of the subject driver (USER ID) is set and, the signals concerning the optimum driving position for reverse driving are input from the detecting means 14, $15_S$ and $15_B$ into the control unit 16, and stored in the memory unit 13 (step 9).

Through the foregoing operation, the optimum driving positions for forward and reverse driving are stored in the memory unit 13 successively with respect to the respective drivers. The operation of adjusting the angle of the rear view mirror M, the position of the driver's seat D and the inclination angle of the seat back portion B on the basis of the stored data such that the optimum driving position (OPT) of an individual driver is achieved, will now be described.

To adjust the driving position for normal driving (forward gear) to accomodate an individual driver, the button assigned to the subject driver of the user-identifying switch button group 61 is pushed at the key-in state of step 2. As a result, the thus selected address (USER ID) is set (step 10), the actual detected data (ACT) concerning the angle of the rear view mirror M, the position of the driver's seat D and the inclination angle of the seat back portion B are read in from the detecting means 14, $15_S$ and $15_B$ (step 11), and the detected data (ACT) is compared successively with the stored data (OPT) which is the optimum setting for the subject driver, stored previously in the memory unit 13 (step 12). When all the signals concerning the actual angle of the rear view mirror M, the position of the driver's seat D and the inclination angle of the seat back position B show the relation ACT=OPT the corresponding operation of the mirror angle adjusting means 11, seat position adjusting means $12_S$ and seat back portion angle adjusting means $12_B$ is terminated in step 13 (OUTPUT-1). However, if the correspondi.:g signal concerning the actual angle of the rear view mirror M, or the position of the driver's seat D, or the inclination angle of the seat back portion B, for example, the signal concerning the position in the fore and aft direction of the driver's seat D, shows the inequality relation ACT$\neq$OPT, a second determination is performed in step 14 to see if ACT<OPT. In case ACT<OPT, in step 15, the seat position adjusting means $12_S$ is actuated (OUTPUT-2) to move the drivers's seat D in a direction, so as to increase the actual position value. On the contrary, if the relation ACT>OPT stands as the result of comparison preformed in step 14, the seat position adjusting means $12_S$ is actuated to move the driver's seat D in the other direction in step 16 (OUTPUT-3) to thus decrease the value of ACT. Signals generated after adjustment by the seat position adjusting means $12_S$ in the OUTPUT-2 or OUTPUT-3 state are read in again in step 11, the thus obtained ACT data is compared with the OPT data, the OUTPUT-2 or OUTPUT-3 state continues until the relation ACT=OPT is attained, and when the relation ACT=OPT is attained, the operation of the seat position adjusting means $12_S$ is terminated (OUTPUT-1). Through a similar manner to the above, adjustment is performed successively by the seat back portion angle adjusting means $12_B$ and/or mirror angle adjusting means 11, in addition to the seat position adjusting means $12_S$, thereby resulting in the optimum driving settings for the subject driver.

To adjust and restore the optimum driving position for reverse driving, for example, when putting the car into a garage, the back switch button 63 is pushed in the key-in state of step 2. As a result, the system stands again in the standby or key-in state (step 17). When any one switch of the switch button group 61 is pushed, the address is set in step 18, similarly to the case when driving in forward gear, the detected data (ACT) is read in at step 19, and compared successively with the stored data (OPT) pertinent to the optimum setting for the subject driver in step 20. When ACT=OPT, the OUTPUT-1 is output in step 21 to stop the adjusting means. If the comparison result indicates the inequality relation ACT$\neq$OPT, a judgment as to whether or not the unequalness comes under the relation ACT<OPT is performed (step 22). In case ACT<OPT, in step 22, the OUTPUT-2 is output to perform adjustment in one backward direction, (increasing ACT), similarly to the above. In case ACT>OPT, in step 24, the OUTPUT-3 is output to perform adjustment in the other direction, such that adjustment is carried out by the respective adjusting means to move the adjustable body to the optimum position. The foregoing operation of adjustment is continued until the data obtained after adjustment satisfy the relation ACT=OPT. When all data show the relation ACT=OPT the optimum driving position for reverse driving is attained for the subject driver.

In the key-in state of step 2, if the full flat button 53 of the console section 50 is pushed, the distance to the full flat position is determined in step 25, an offset value is output (step 26), and the driving seat D assumes the full flat state in which the seat portion S and seat back portion B lie substantially on the same plane. On the other hand, if the full back button 54 is pushed, offset determination is performed in step 27, and the driver's seat D moves to the rearmost position spaced most away from the steering wheel H on the basis of an offset ouptut (step 28), the thus resulted state being convenient for the driver to get in and out of the automobile. Differently, if the stop button 64 is pushed while the foregoing adjustment operation concerning the normal or rearward running time is taking place or the driver's seat is changing into the full flat or full back state, an OUTPUT PORT-ZERO is output (step 29) and all adjustment operations are suspended.

Although the foregoing embodiment includes the switch button group 61 consisting of four buttons $61_1$–$61_4$, the present invention should not be limited to that number, and the number of these buttons may be selected appropriately so as to provide plural driving positions best suited to the individuality of respective drivers. The present invention should not be limited to the illustrated configuration of the adjusting means for the rear view mirror M and driver's seat D; these means are sufficient if they achieve automatically a desired adjustment in response to control of the buttons on the side of the driver's seat D. Further, the adjusting mechanism concerning the position of the driver's seat may include further an adjusting means for adjusting the vertical position of the driver's seat D, in addition to the foregoing operation mode.

As described hereinabove, the control device according to the present invention can control the angle of the driver's mirrors, i.e. the rear view mirror position, in an automobile used in common among several drivers through a very simple operation so that the resultant state may be best suited to the individuality of respective drivers; thus, smooth and safe driving is assured.

Aside from automobiles, the present invention may be applied to other situations where it is desirable to adjust a mirror to a position previously determined by a user such that experimental adjustment of the mirror is eliminated after an optimum position has been found by the user during a previous use.

What is claimed is:

1. An automatic driving position control device, comprising:
   seat position adjusting means for adjusting the position of a driver's seat of an automobile;
   seat detecting means for detecting the actual position of the seat;
   mirror angle adjusting means for adjusting the angle of a rearview mirror of an automobile;
   mirror detecting means for detecting the actual angle of the mirror;
   memory means including a first memory part for storing a first optimum seat position and first optimum angle setting of the mirror for forward driving, and a second memory part for storing a second optimum angle setting of the mirror for reverse driving, for each of a plurality of drivers;
   first driving position selection means for selecting a driving position of the seat and rearview mirror for forward driving, including outputting data stored in said first memory part;
   second driving position selection means for selecting a driving position of the rearview mirror for reverse driving, including outputting data stored in said second memory part; and
   a control unit, operated in response to said first selection means or said second selection means, selectively, having setting means for setting an optimum seat position and angle of the rearview mirror for a selected driver by reading out an optimum seat position and mirror angle setting stored in said first memory part or second memory part, respectively, comparing the optimum seat position and angle setting to the actual seat position and mirror angle detected by the seat and mirror detecting means, and outputting a control signal to said seat position adjusting means and mirror angle adjusting means to bring the actual seat position and angle of the mirror in correspondence to the optimum seat position and mirror angle setting.

2. A mirror position control device according to claim 1, wherein said mirror angle adjusting means includes a pair of vertically-arranged operation levers one of which is coupled to an electric motor and another pair of horizontally-arranged operation levers one of which is coupled to another electric motor.

3. A mirror position control device according to claim 1, wherein said detecting means is an encoder coupled to said electric motor for detecting rotation thereof.

4. A mirror position control device according to claim 1, wherein said detecting means is a photo sensor responsive to movement of said operation levers.

5. A mirror position control device according to claim 1, including further a console section connected electrically to said control unit for sending instruction signals to said control unit.

6. A mirror position control device according to claim 1, wherein said console includes switches for actuating the adjustment means to adjust the mirror in a desired direction and for storing a new position in said memory means.

7. An automatic rearview mirror position control device, comprising:
   mirror angle adjusting means for adjusting the angle of a rearview mirror of an automobile;
   detecting means for detecting the actual angle of the mirror;
   memory means for storing a first optimum angle setting of the mirror for forward driving, and a second optimum angle setting of the mirror for reverse driving, for each of a plurality of drivers; and
   a control unit having entry means for entering an optimum angle of the mirror for each of a plurality of drivers, and setting means for setting an optimum angle of the mirror for a selected driver by reading out an optimum angle setting stored in memory, comparing the optimum angle to the actual angle detected by the detecting means, and outputting a control signal to said mirror angle adjusting means to bring the actual angle of the mirror in correspondence to the optimum angle,
   wherein said entry means and said setting means together include a pluality of driver identification ID switches each corresponding to a respective selected driver, a SET switch for operating said control unit for setting said first optimum angle for forward driving, and a BACK switch for operating said control unit for setting said second optimum angle for reverse driving,
   whereby entering an optimum angle for a selected driver is obtained by operating one of said driver ID switches corresponding to a selected driver followed by operating said SET or said BACK switch to store the detected actual angle for forward or reverse driving, respectively, which is adjusted to an optimum angle for the selected driver, and setting an optimum angle for a selected driver is obtained by operating said SET or said BACK switch followed by operating one of said driver ID switches corresponding to the selected driver for setting the mirror to the optimum angle for forward or reverse driving, respectively.

* * * * *